(12) United States Patent
Swanson

(10) Patent No.: US 9,045,018 B2
(45) Date of Patent: Jun. 2, 2015

(54) CONTROL SYSTEM FOR AUXILIARY POWER UNIT

(75) Inventor: David A. Swanson, Green Bay, WI (US)

(73) Assignee: THERMO KING CORPORATION, Minneapolis, MN (US)

( * ) Notice: Subject to any disclaimer, the term of this patent is extended or adjusted under 35 U.S.C. 154(b) by 2966 days.

(21) Appl. No.: 11/335,051

(22) Filed: Jan. 19, 2006

(65) Prior Publication Data
US 2006/0173586 A1 Aug. 3, 2006

Related U.S. Application Data

(60) Provisional application No. 60/645,701, filed on Jan. 21, 2005.

(51) Int. Cl.
| | | |
|---|---|---|
| G06F 17/00 | (2006.01) | |
| B60H 1/00 | (2006.01) | |
| B60H 1/32 | (2006.01) | |
| H02J 7/14 | (2006.01) | |

(52) U.S. Cl.
CPC ........ *B60H 1/00378* (2013.01); *B60H 1/00778* (2013.01); *B60H 1/3226* (2013.01); *H02J 7/1415* (2013.01); *H02J 7/1438* (2013.01)

(58) Field of Classification Search
USPC .......................................................... 701/1
See application file for complete search history.

(56) References Cited

U.S. PATENT DOCUMENTS

| | | | |
|---|---|---|---|
| 3,545,222 A | 12/1970 | Petranek | |
| 3,844,130 A | 10/1974 | Wahnish | |
| 4,459,519 A | 7/1984 | Erdman | |
| 4,667,480 A | 5/1987 | Bessler | |
| 4,682,649 A * | 7/1987 | Greer | 165/43 |
| 4,756,359 A * | 7/1988 | Greer | 165/43 |
| 4,762,170 A | 8/1988 | Nijjar et al. | |
| 5,006,045 A | 4/1991 | Shimoda et al. | |
| 5,056,330 A | 10/1991 | Isobe et al. | |
| 5,138,851 A * | 8/1992 | Mardikian | 62/244 |
| 5,177,978 A | 1/1993 | Brown | |
| 5,316,074 A | 5/1994 | Isaji et al. | |
| 5,333,678 A * | 8/1994 | Mellum et al. | 165/42 |
| 5,557,938 A | 9/1996 | Hanson et al. | |
| 5,557,941 A | 9/1996 | Hanson et al. | |
| 5,572,879 A | 11/1996 | Harrington et al. | |
| 5,596,878 A | 1/1997 | Hanson et al. | |
| 5,625,245 A * | 4/1997 | Bass | 310/306 |
| 5,632,155 A | 5/1997 | Sugiyama et al. | |
| 5,678,512 A | 10/1997 | Colton | |
| 5,699,670 A | 12/1997 | Jurewicz et al. | |
| 5,730,216 A | 3/1998 | Viegas et al. | |
| 5,901,572 A * | 5/1999 | Peiffer et al. | 62/480 |
| 6,062,030 A | 5/2000 | Viegas | |
| 6,075,328 A | 6/2000 | Notohara et al. | |
| 6,095,427 A | 8/2000 | Hoium et al. | |
| 6,223,546 B1 | 5/2001 | Chopko et al. | |
| 6,272,873 B1 * | 8/2001 | Bass | 62/238.3 |
| 6,282,906 B1 * | 9/2001 | Cauchy | 62/3.3 |

(Continued)

*Primary Examiner* — John Q Nguyen
*Assistant Examiner* — Kyung Kim
(74) *Attorney, Agent, or Firm* — Hamre, Schumann, Mueller & Larson, P.C.

(57) ABSTRACT

A control system for a vehicle that includes a cabin and a primary engine. The control system includes an auxiliary power unit and a microprocessor in communication with the primary engine, the cabin, and the auxiliary power unit. The control system selectively activates the auxiliary power unit to control an engine parameter and a cabin parameter when the primary engine is shutdown.

29 Claims, 11 Drawing Sheets

(56) References Cited

U.S. PATENT DOCUMENTS

| | | | |
|---|---|---|---|
| 6,590,758 B1 * | 7/2003 | Friede et al. | 361/170 |
| 6,685,281 B2 * | 2/2004 | MacGregor et al. | 303/123 |
| 6,786,209 B2 * | 9/2004 | Stewart | 123/568.11 |
| 6,945,207 B2 * | 9/2005 | Biess et al. | 123/142.5 R |
| 7,013,646 B1 * | 3/2006 | Serkh et al. | 60/698 |
| 2003/0034147 A1 * | 2/2003 | Houck et al. | 165/42 |
| 2004/0104578 A1 * | 6/2004 | Wurtele | 290/1 A |
| 2004/0144080 A1 * | 7/2004 | Suzuki et al. | 60/276 |
| 2004/0169374 A1 * | 9/2004 | Wurtele et al. | 290/1 A |
| 2004/0231831 A1 * | 11/2004 | Houck et al. | 165/202 |
| 2005/0016713 A1 * | 1/2005 | Houck et al. | 165/42 |
| 2005/0035657 A1 * | 2/2005 | Brummett et al. | 307/10.1 |
| 2006/0042583 A1 * | 3/2006 | Bourgault et al. | 123/142.5 R |
| 2006/0107920 A1 * | 5/2006 | Serkh et al. | 123/198 R |
| 2006/0150657 A1 * | 7/2006 | Spurgeon et al. | 62/331 |

* cited by examiner

CONTROL SYSTEM FOR AUXILIARY POWER UNIT

This application claims priority to U.S. Provisional Application No. 60/645,701, filed Jan. 21, 2005, the entire contents of which is hereby incorporated by reference herein.

BACKGROUND

The present invention relates to control systems and more particularly to a control system for use on a truck tractor or other vehicle that includes an auxiliary power unit.

Auxiliary power units are used with tractors to reduce fuel consumption, maintenance costs, emissions, and noise generated when a tractor engine idles during driver rest periods or other periods of vehicle non-movement. Some auxiliary power units are used in conjunction with multiple control systems to power vehicle functions such as heating, cooling, engine warming, lighting, or powering other vehicle functions and operator convenience accessories. These auxiliary power units do not include control systems that are capable of combining the various functions of the vehicle into one system. For example, the air conditioning, the air heating, the engine heater, and lighting functions are typically each controlled by a separate control system. Existing control systems have high manufacturing and retail costs, and are bulky and cumbersome to install and operate.

SUMMARY

The present invention provides a control system for a tractor or vehicle that includes a primary engine and an auxiliary power unit. The control system efficiently manages heating and cooling of a cabin of the vehicle using the auxiliary power unit, allows charging of vehicle batteries, provides a power source for vehicle and operator convenience accessories, and provides warming of the primary engine when the primary engine is shutdown.

In one embodiment, the invention provides a control system for a vehicle that includes a cabin and a primary engine having an ignition switch. The control system includes an auxiliary power unit coupled to the primary engine and a microprocessor in communication with the primary engine and the cabin. The microprocessor activates the auxiliary power unit and controls an engine parameter and a cabin parameter when the primary engine is shutdown.

In another embodiment, the invention provides a control module for a vehicle that includes a cabin, a primary engine having an ignition switch, and an auxiliary power unit having an air conditioning system in communication with the cabin. The control module includes a housing having a front panel and at least one wall that defines an interior space. The control module further includes a plurality of user interfaces coupled to the housing which deliver a signal indicative of a desired cabin parameter. A processor disposed within the housing responds to the signal and controls the air conditioning system to control a cabin parameter when the primary engine is shutdown.

In yet another embodiment, the invention provides a vehicle that includes a primary engine, a cabin, and a control system. The control system includes an auxiliary power unit coupled to the primary engine and a microprocessor in communication with the primary engine and the cabin. The microprocessor activates the auxiliary power unit in response to shutdown of the primary engine and controls an engine parameter and a cabin parameter when the primary engine is shutdown.

In still another embodiment, the invention provides a control system for a vehicle that includes a primary engine and an ignition switch having at least a first position and a second position in electrical communication with the primary engine. The control system includes a control module having at least a first mode and a second mode and a microprocessor in electrical communication with the ignition switch and the control module. The microprocessor responds to the at least one position to monitor and control the control module in the first mode. The microprocessor further responds to the second position to monitor and control the control module in the second mode.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
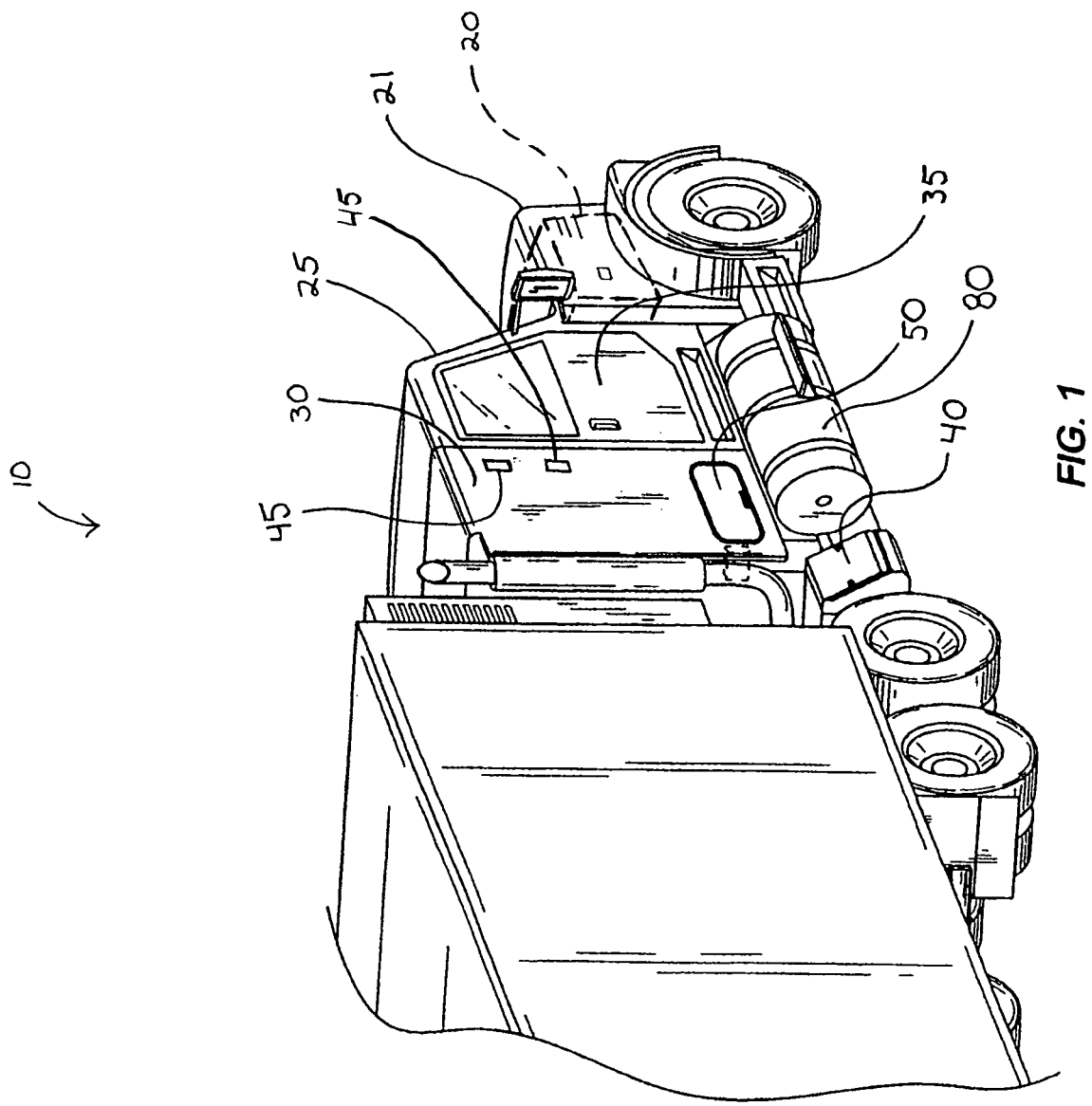
FIG. 1 is a perspective view of a vehicle that includes a control system of the present invention.

FIG. 1 shows a vehicle 10 that includes a control system 15 of the present invention. The vehicle 10 is a conventional semi-tractor or other similar vehicle. The vehicle 10 includes a primary engine 20 disposed in a compartment 21, a cabin 25 defining a sleeping portion 30 and a driving portion 35, an auxiliary power unit 40, a plurality of vehicle accessories 45

(e.g., 12 volt electronic communications, operator convenience devices, vehicles lights, etc.), and a storage area 50. The primary engine 20 is a standard diesel engine sufficient to operate the vehicle 10. The primary engine 20 is coupled with a primary air conditioning system (not shown) to provide conditioned air to the cabin 25.

Figure 2:
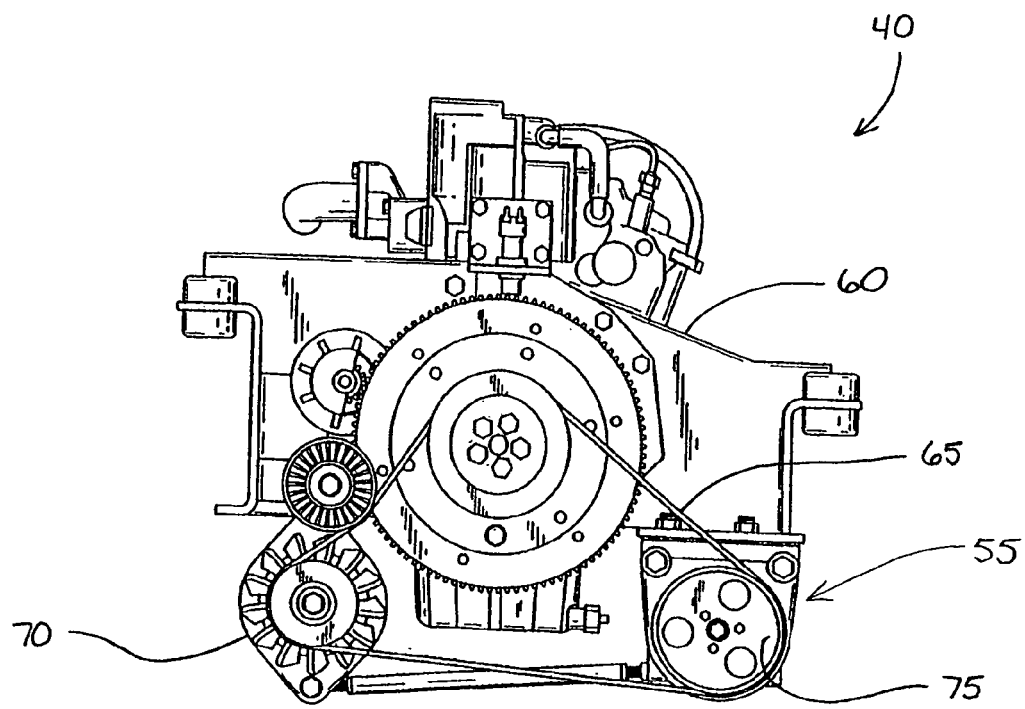
FIG. 2 front view of an auxiliary power unit of the vehicle of FIG. 1.

FIG. 2 illustrates the auxiliary power unit 40 that is in communication with the primary engine 20 and a secondary air conditioning system 55, and includes a secondary engine 60. The auxiliary power unit 40 is a secondary power unit for the vehicle 10 when the primary engine 20 is disengaged. The auxiliary power unit 40 may be attached to the vehicle 10 using any attachment method. The secondary engine 60 is coupled with a belt 65 to drive an alternator 70 and a compressor 75 of the secondary air conditioning system 55 to provide cooling air to the cabin 25. One embodiment of the secondary engine 60 uses a two-cylinder Yanmar diesel engine. However, a variety of engines may be employed to operate the illustrated auxiliary power unit 40.

The primary engine 20 and the auxiliary power unit 40 are in fluid communication with a coolant system (not shown) of the vehicle 10, and are further in fluid communication with a fuel system (not shown). The coolant system is shared between the primary engine 20 and the auxiliary power unit 40 and facilitates operation of the primary engine 20 and the auxiliary power unit 40 at an operable temperature. The fuel system allows fuel to flow to the primary engine 20 and to the auxiliary power unit 40 from a common reservoir 80 (see FIG. 1). Alternatively, the fuel system may provide fuel to the primary engine 20 from a first reservoir and to the auxiliary power unit 40 from a second reservoir separate from the first reservoir.

The secondary air conditioning system 55 is in communication with the cabin 25 and includes a cooling system 85, a heating system 90, a defrost system (not shown), and at least one fan (not shown). The secondary air conditioning system 55 is separately operable from the primary air conditioning system to condition air within the cabin 25 using the cooling system 85, the heating system 90, the defrost system, and the fan. The cooling system 85 includes the compressor 75, a condenser (not shown), and an evaporator (not shown). The cooling system 85 uses an environmentally friendly refrigerant such as R-134a. The condenser is located on the vehicle 10 such that heat from the cooling system 85 is transferred to the atmosphere surrounding the vehicle 10. In one embodiment, the condenser is mounted to an exterior wall of the vehicle 10. The evaporator may take a compact design and be installed under a bunk (not shown) in the sleeping portion 30, or another convenient location.

Figure 3:
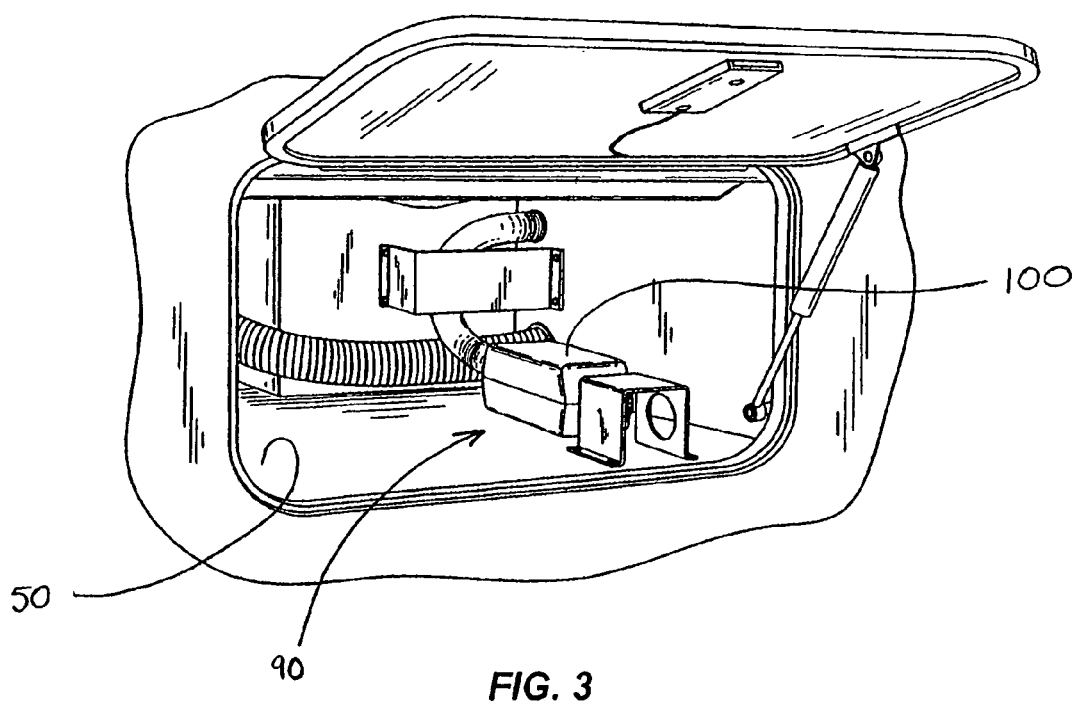
FIG. 3 is a perspective view of a portion of a secondary air conditioning system of the vehicle of FIG. 1.

FIG. 3 illustrates a heater 100 of the heating system 90. The air heating system 90 may further include at least one heating sensor (not shown) operable to deliver a signal indicative of a heater temperature and/or a heater flame. The heater 100 is in fluid communication with the fuel system to receive fuel from the reservoir 80 such that a separate heater fuel reservoir is not required. The heater 100 is a direct-fired diesel heater that includes heating elements (e.g., glow pin, heat exchanger, etc.) to generate heated air and to provide heat to the cabin 25. The heater 100 fits within the storage area 50 or inside the sleeping portion 30. One embodiment of the heater 100 uses an Espar D2 Airtronic heater, although other heaters can be used in place of the Espar D2 Airtronic heater.

Figure 4:
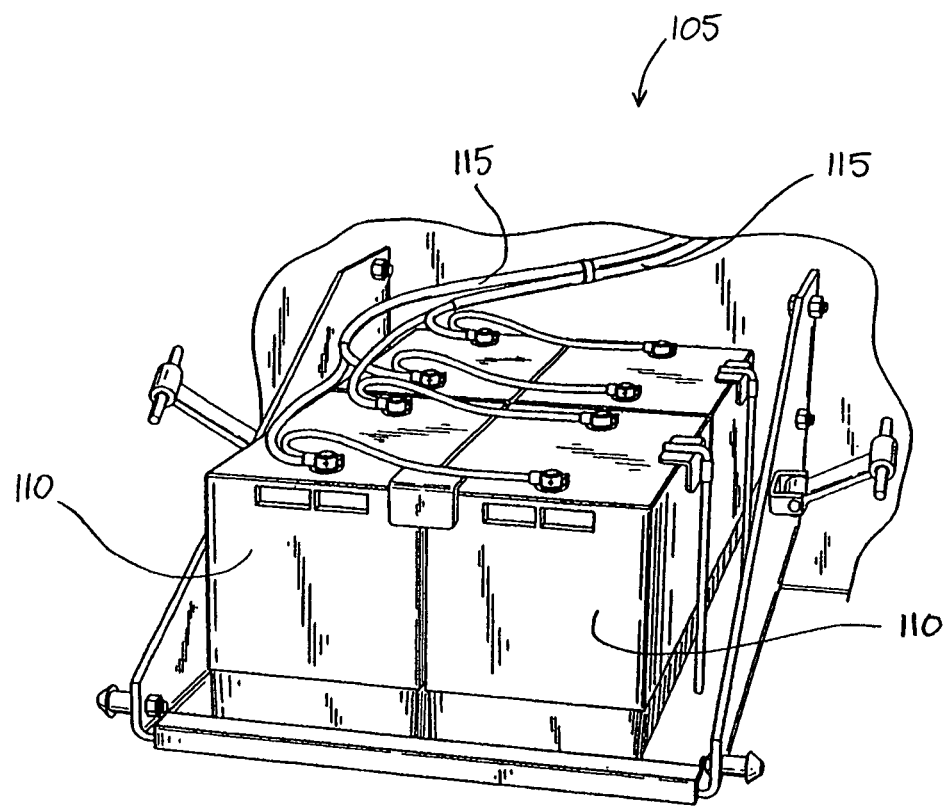
FIG. 4 is a perspective view of a battery assembly of the vehicle of FIG. 1.

FIG. 4 shows a battery assembly 105 that is in electrical communication with the primary engine 20 and the auxiliary power unit 40. The battery assembly 105 is operable to supply electrical power to the plurality of vehicle accessories 45 and to other components of the vehicle 10. When the primary engine 20 is engaged, the primary engine 20 provides a charge to the battery assembly 105 to maintain a battery voltage. When the primary engine 20 is disengaged and the auxiliary power unit 40 is engaged, the auxiliary power unit 40 provides a charge to the battery assembly 105 to maintain the battery voltage. The battery assembly 105 includes at least one battery 110 and a battery cable 115 that interconnects the at least one battery 110 with the primary engine 20 and the auxiliary power unit 40.

Figure 5:
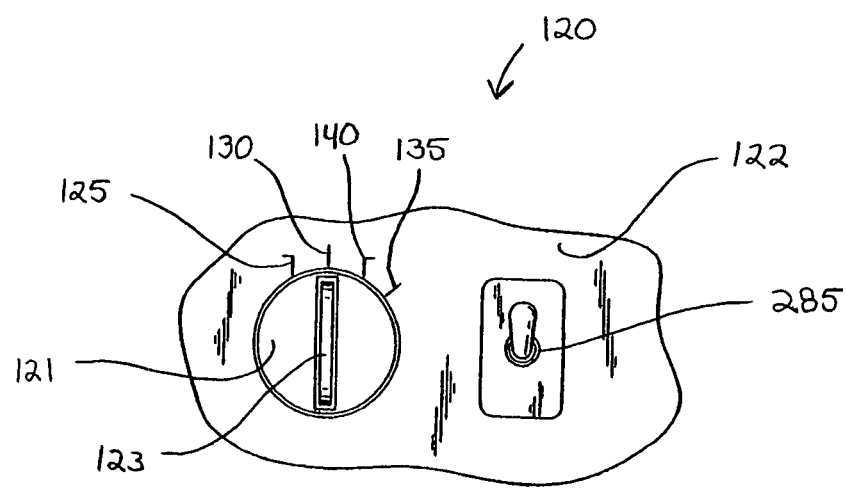
FIG. 5 is a front view of an ignition system of the vehicle of FIG. 1.

FIG. 5 illustrates a portion of an ignition system 120 of the primary engine 20 that includes an ignition switch 121 attached to a dashboard 122 of the vehicle 10. The ignition switch 121 utilizes a key 123 to change the primary engine 20 between an accessories position 125, an off position 130, a start position 135, and an ignition position 140. The accessories position 125 allows operation of the plurality of vehicle accessories 45 without engagement of the primary engine 20. The off position 130 terminates operation of the primary engine 20. The start position 135 allows the user to engage the primary engine 20. The ignition position 140 allows the primary engine 20 to continue operation after the primary engine 20 has been started.

Figure 6:
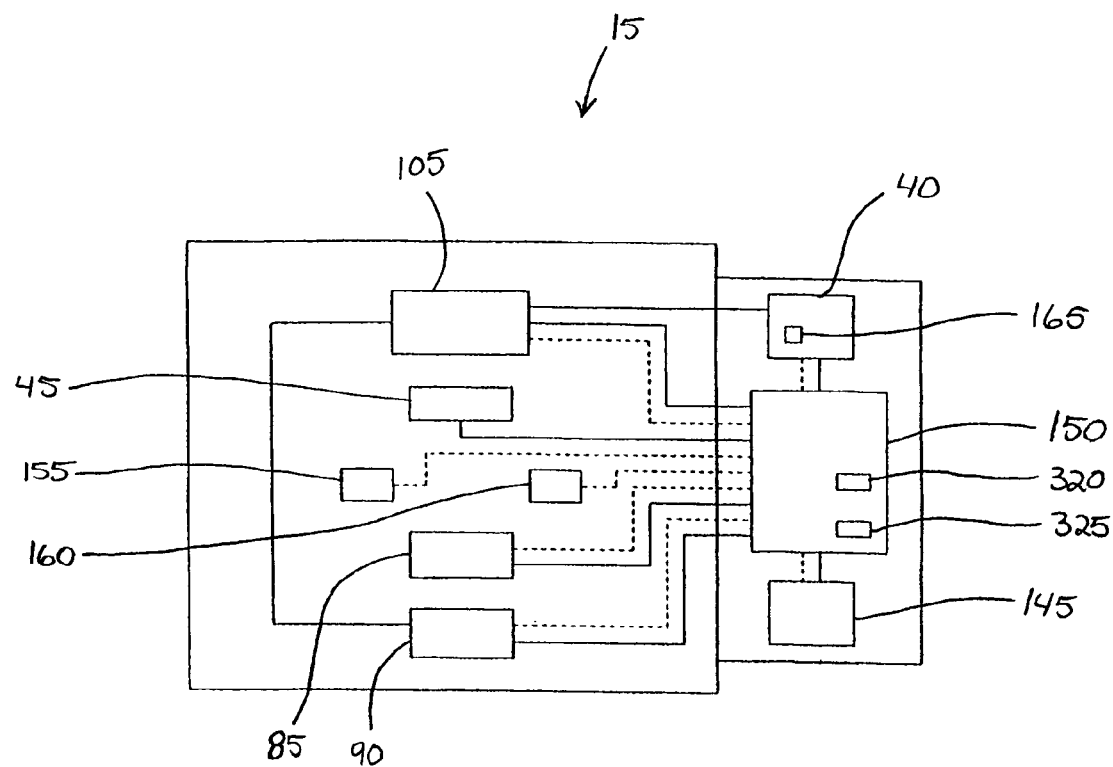
FIG. 6 is a schematic view of the control system of FIG. 1, including a microprocessor and a control module.

FIG. 6 illustrates a schematic of the control system 15 in communication with the vehicle 10. The control system 15 includes a plurality of sensors, a control module 145, and a microprocessor 150. The plurality of sensors are operable to communicate signals indicative of parameters of the vehicle 10 to the microprocessor 150. The parameters include measurable factors and conditions (e.g., temperature, pressure, fan speed, switch positions, loss of power, on/off state of the primary engine and auxiliary power unit, etc.) of the vehicle 10.

The plurality of sensors includes at least one engine sensor 155, at least one cabin sensor 160, and at least one secondary engine sensor 165. Additional sensors, such as an outdoor sensor (not shown) and other vehicle sensors, may also be incorporated in the control system 15. The engine sensor 155 is in communication with the primary engine 20 and is operable to deliver a signal indicative of a primary engine parameter to the microprocessor 150. The primary engine parameter includes conditions of the primary engine 20, the battery assembly 105, the fuel system, and the coolant system. In one embodiment, the primary engine parameter includes an engine temperature (e.g., coolant temperature, engine block temperature, etc.). Other embodiments of the primary engine parameter include the battery voltage, an on/off state of the primary engine, a primary engine oil temperature and/or pressure, and a primary engine water temperature and/or pressure. The primary engine parameter may further include other conditions of the vehicle 10.

The cabin sensor 160 is in communication with the cabin 25 and is operable to deliver a signal indicative of a cabin parameter to the microprocessor 150. The cabin parameter includes conditions of the primary air conditioning system, the cooling system 85, the heating system 90, the defrost system, and the at least one fan. In a preferred embodiment, the cabin parameter includes a measured cabin temperature, and at least one state of the cooling system 85, the heating system 90, the defrost system, and the fan. In other embodiments, the cabin parameter may include fan speed, a refrigerant temperature, a heater element temperature, and operation of the compressor, condenser, and/or evaporator. In still other embodiments, the cabin parameter may indicate a position of the ignition switch 121, or other conditions of the cabin 25.

The secondary engine sensor 165 is in communication with the auxiliary power unit 40 and is operable to deliver a signal indicative of a secondary engine parameter to the microprocessor 150. The secondary engine parameter includes conditions of the auxiliary power unit 40, such as an on/off state of the secondary engine 60 and a secondary engine temperature (e.g., coolant temperature, engine block temperature, etc.). In other embodiments, the secondary engine parameter includes at least one state of the alternator 70, an auxiliary power unit oil temperature and/or pressure, and an auxiliary power unit water temperature and/or pressure. In still other embodiments, the secondary engine parameter may include other conditions of the auxiliary power unit 40.

Figure 7:
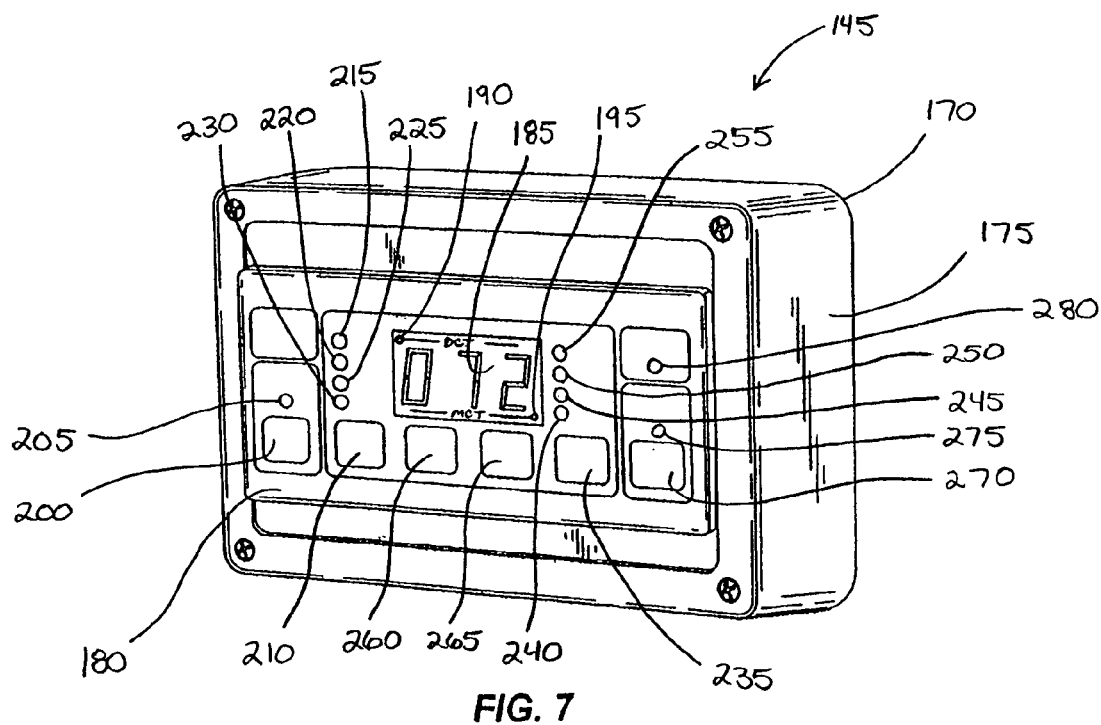
FIG. 7 is a perspective view of the control module of FIG. 6.

FIG. 7 illustrates one construction of the control module 145 that is located within the cabin 25 and coupled with the battery assembly 105. Alternatively, the control module 145 may include a power source separate from the battery assembly 105. In one embodiment, the control module 145 is attached adjacent the sleeping portion 30 for control of the control system 15 by the user when the user is at rest. In another embodiment, the control module 145 is attached adjacent the driving portion 35 for control of the control system 15 when the user is operating the vehicle 10.

The control module 145 is selectively operable to deliver at least one signal indicative of a desired vehicle parameter to the microprocessor 150 using a controller (not shown). The control module 145 is further operable to receive signals, such as signals from the microprocessor 150 and at least one signal from the outdoor sensor indicative of an outdoor condition (e.g., outdoor temperature, etc.). The controller facilitates storage of data (e.g., programmable conditions, etc.) associated with the control module 145 and is operable to communicate the desired vehicle parameter to the microprocessor 150 through an input/output operator (not shown). Alternative constructions of the control module 145 may include additional components not shown to facilitate control and storage of data within the control module 145.

The control module 145 further includes a housing 170 having a wall 175 and a front panel 180. The wall 175 and the front panel 180 define an interior space which supports at least a portion of the controller. The front panel 180 includes a display 185, a power interface, an environment interface, a fan interface, a parameter adjustment or adjustment assembly, and a system interface that are in electrical communication with the controller. The display 185 is selectively operable to show the measured cabin temperature, the desired cabin temperature, the outdoor condition, a plurality of alarm codes associated with the control system 15, and other information related to the control system 15. The programmable features and/or equipment used in the control system 15 determine the information available to be shown on the display 185. The display 185 selectively indicates the desired cabin temperature using a first indicator 190, and selectively indicates the measured cabin temperature using a second indicator 195. Alternatively, the display 185 may selectively indicate other cabin parameters. The preferred embodiment of the display 185 is digital, although the display 185 may employ analog or other types of display.

The power interface, the environment interface, the fan interface, the parameter adjustment, and the system interface are separately operable to deliver the at least one signal indicative of the desired vehicle parameter to the controller. The desired vehicle parameter allows the user to vary the engine parameter, the cabin parameter, and the secondary engine parameter in response to user-selectable inputs to the control module 145. In a preferred embodiment, the desired vehicle parameter includes a desired cabin temperature. Other embodiments of the desired vehicle parameter include other desired conditions of the vehicle 10, as described below.

The power interface is in electrical communication with the battery assembly 105 and includes a power switch 200 and a third indicator 205. The power switch 200 allows the user to vary the control system between an "on" and an "off" state. The third indicator 205 selectively illuminates when the control system 15 is turned "on."

The environment interface includes a mode key 210 that is selectable between a cooling system mode 215, a heating system mode 220, a defrost system mode 225, and a fan mode 230. The cooling system mode 215, the heating system mode 220, the defrost system mode 225, and the fan mode 230 allow the user to selectively activate the cooling system 85, the heating system 90, the defrost system, and the fan. The user facilitates variation from one mode to another mode by depressing the mode key 210. When the control module 145 first receives power through activation of the power switch 200, the mode key 210 will default to the mode selected prior to shutdown of the control module 145. An indicator selectively illuminates adjacent and in response to the selected mode. The environment interface may remain off when there is a lack of selection of a particular mode. Additional modes that are selectable using the mode key 210 are also possible and considered herein.

The fan interface includes a fan speed key 235 that allows selective adjustment of the fan speed and includes an auto mode 240, a high mode 245, a medium mode 250, and a low mode 255. An off mode (not shown) may be incorporated into the fan interface to turn the fan "off." The user facilitates variation from of the fan speed by depressing the fan speed key 235. When the control module 145 is first activated using the power switch 200, the fan speed key 235 will default to the previous fan speed mode selected. An indicator selectively illuminates adjacent and in response to the selected fan speed.

The parameter adjustment is located adjacent the display 185 and includes an increase button 260 and a decrease button 265. The increase button 260 and the decrease button allow the user to incrementally vary the desired cabin temperature a predetermined amount (e.g., 1 degree, 2 degrees, etc.). In one embodiment, if either the increase button 260 or the decrease button 265 is pressed for a predetermined time, the desired cabin temperature will continue to increase or decrease accordingly. In other embodiments, the increase button 260 and the decrease button 265 allow the user to vary the first indicator 190, the second indicator 195. In still other embodiments, the buttons 260, 265 may allow the user to vary the modes associated with the mode key 210 and/or the fan speed key 235.

The system interface includes a standby switch 270, a fourth indicator 275, and a fault indicator 280. The standby switch 270 enables selection of a standby mode and a normal mode of the control system 15. The standby mode temporarily disables the control module 145 and allows the control system 15 to operate according to the setting of the standby mode when the control system 15 was last in the standby mode. The normal mode allows control of the secondary air conditioning system 55 and the auxiliary power unit 40 using the control module 145. The fourth indicator 275 selectively illuminates to notify the user when the control module 145 is in the standby mode. The fault indicator 280 is operable to indicate a fault in the control system 15. The alarm codes are shown on the display 185 when the fault indicator 280 is activated.

Referring back to FIG. 5, the ignition switch 121 is coupled with the microprocessor 150 such that when the ignition switch 121 is in the accessories position 125 or the off position 130, the primary engine 20 is shutdown and the control system 15 is operable to control the auxiliary power unit 40 in the normal mode. When the ignition switch 121 is in the start position 135 or the ignition position 140, the primary engine 20 is engaged and the control system 15 changes to the standby mode and ceases operation of the auxiliary power unit 40. Reactivation of the auxiliary power unit 40 occurs when the ignition switch 121 returns to the accessories or off positions 125, 130.

In another embodiment shown in FIG. 5, a secondary switch 285 is coupled with the ignition switch 121 and the microprocessor 150. The secondary switch 285 allows selective operation of the control system 15 in the normal mode in response to the position of the ignition switch 121, as described previously. When the secondary switch 285 is in an off position, the control system 15 ceases operation of the auxiliary power unit 40 regardless of the position of the ignition switch 121. The secondary switch 285 includes a toggle switch, although other switches can be used for the purposes described herein.

Figure 8:
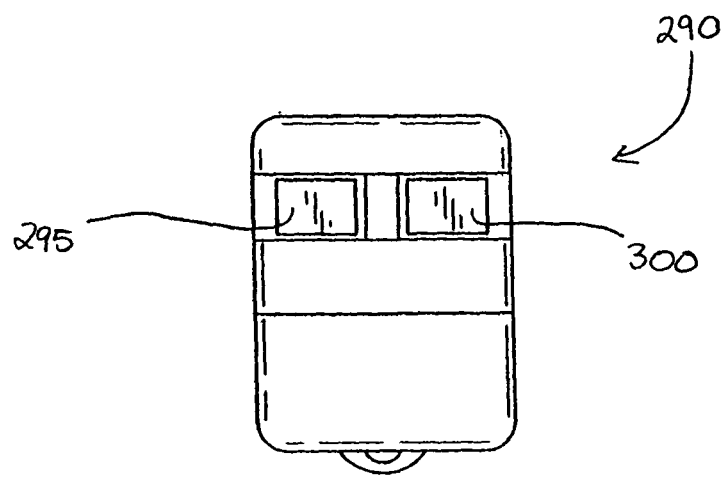
FIG. 8 is a front view of another embodiment of a control for the control system of FIG. 6, including a wireless remote.
Figure 9:
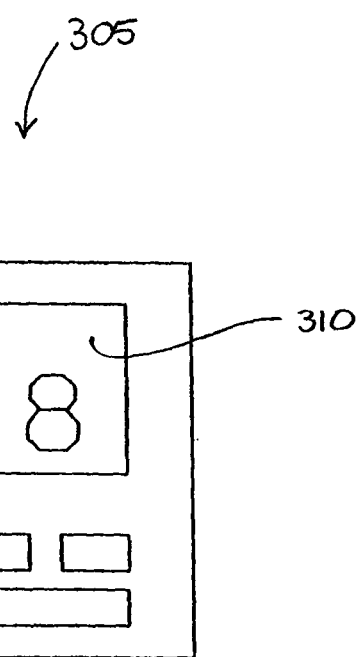
FIG. 9 is a front view of another embodiment of a control for the control system of FIG. 6, including a timer.

FIGS. 8 and 9 show other embodiments of selection of the standby mode and the normal mode. FIG. 8 illustrates a wireless remote 290 that includes a first button 295 and a second button 300. The first and second buttons 295, 300 allow a user to toggle the control system 15 between the normal mode and the standby mode. The microprocessor is operable to receive a signal from the wireless remote 290 and to vary the control system between the normal mode and the standby mode in response to the signal. The wireless remote 290 may be carried by the user or attached to a key ring (not shown).

FIG. 9 shows a timer 305 that facilitates programmable control of the control system 15. The timer 305 can be a separate unit from the control module 145 or integrated within the control module 145. The timer 305 provides activation and deactivation of all or part of the control system 15 based on predefined parameters programmed into the timer 305. The timer 305 includes a display 310 and a plurality of interfaces that are operable by the user to vary the programmed parameters. Alternative embodiments that move the control system 15 between the normal mode and the standby mode can be effectuated by any number of other input devices or other types of integration with tractor systems, including integration of an input device with a computer control system of the vehicle 10.

Figure 10:
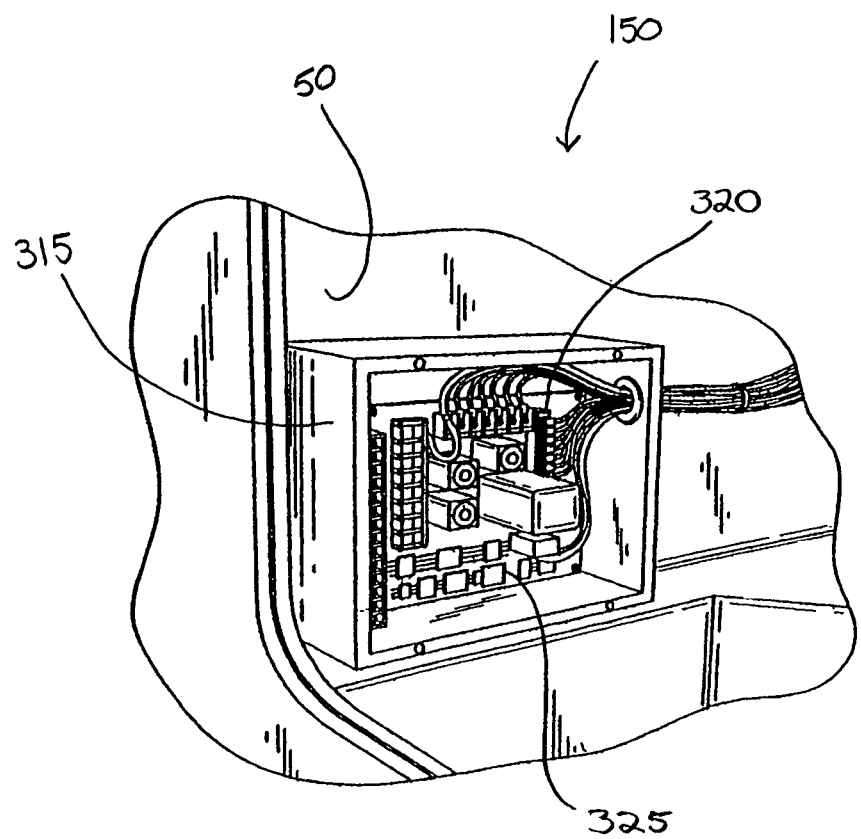
FIG. 10 is a perspective view of the microprocessor of FIG. 6.

FIG. 10 shows one construction of the microprocessor 150 that includes programmable features. The microprocessor 150 is disposed within a control box 315 mounted in the storage area 50. The microprocessor 150 facilitates control of the control system 15 as a central control unit and includes an input/output operator 320 and a storage system 325 (e.g., EPROM, EEPROM, etc.). The microprocessor 150 is operable to monitor and control the primary engine parameter, the cabin parameter, and the secondary engine parameter and to operate the auxiliary power unit 40 when the primary engine 20 is shutdown using the input/output operator 320. The microprocessor 150 is further operable to vary the measured cabin parameter in response to the desired cabin parameter through operation of the secondary air conditioning system 55 using the input/output operator 320. The storage system 325 provides storage of data related to the control system 15. Alternative constructions of the microprocessor 150 may include additional components to facilitate control and storage of data within the control system 15.

Figure 11:
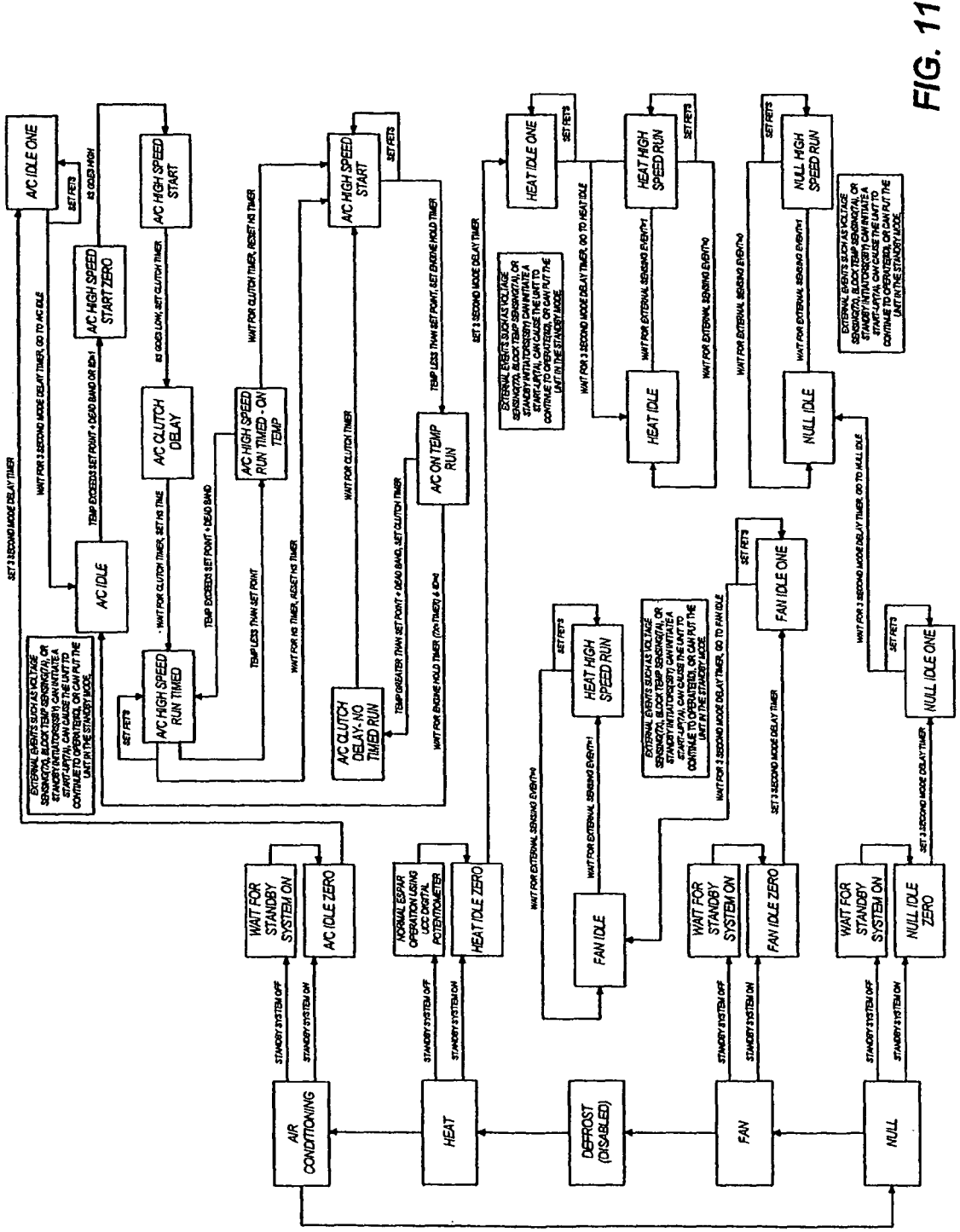
FIG. 11 is a flow chart of one embodiment of control logic for the control system of FIG. 6.
Figure 11A:
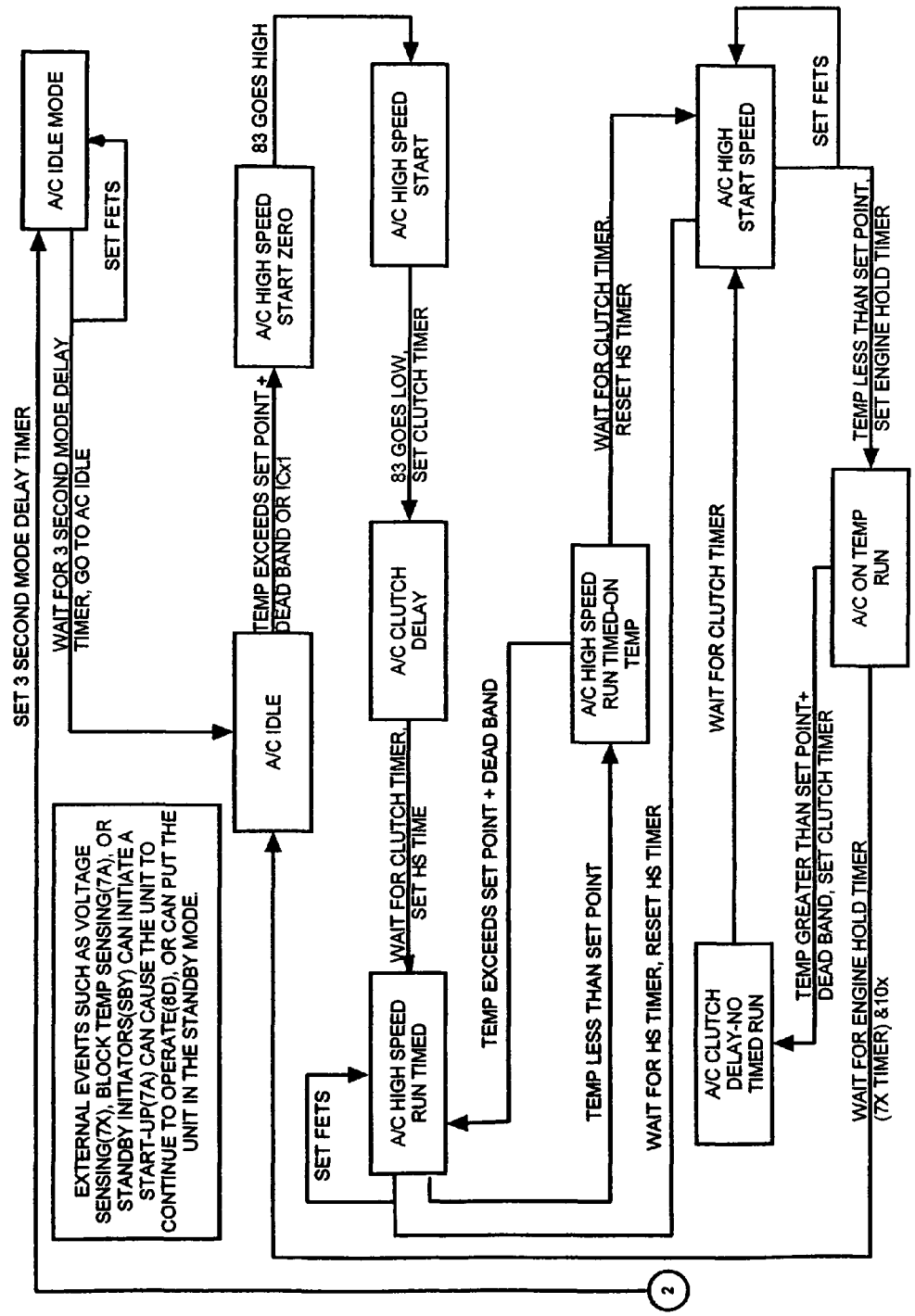
Figure 11B:
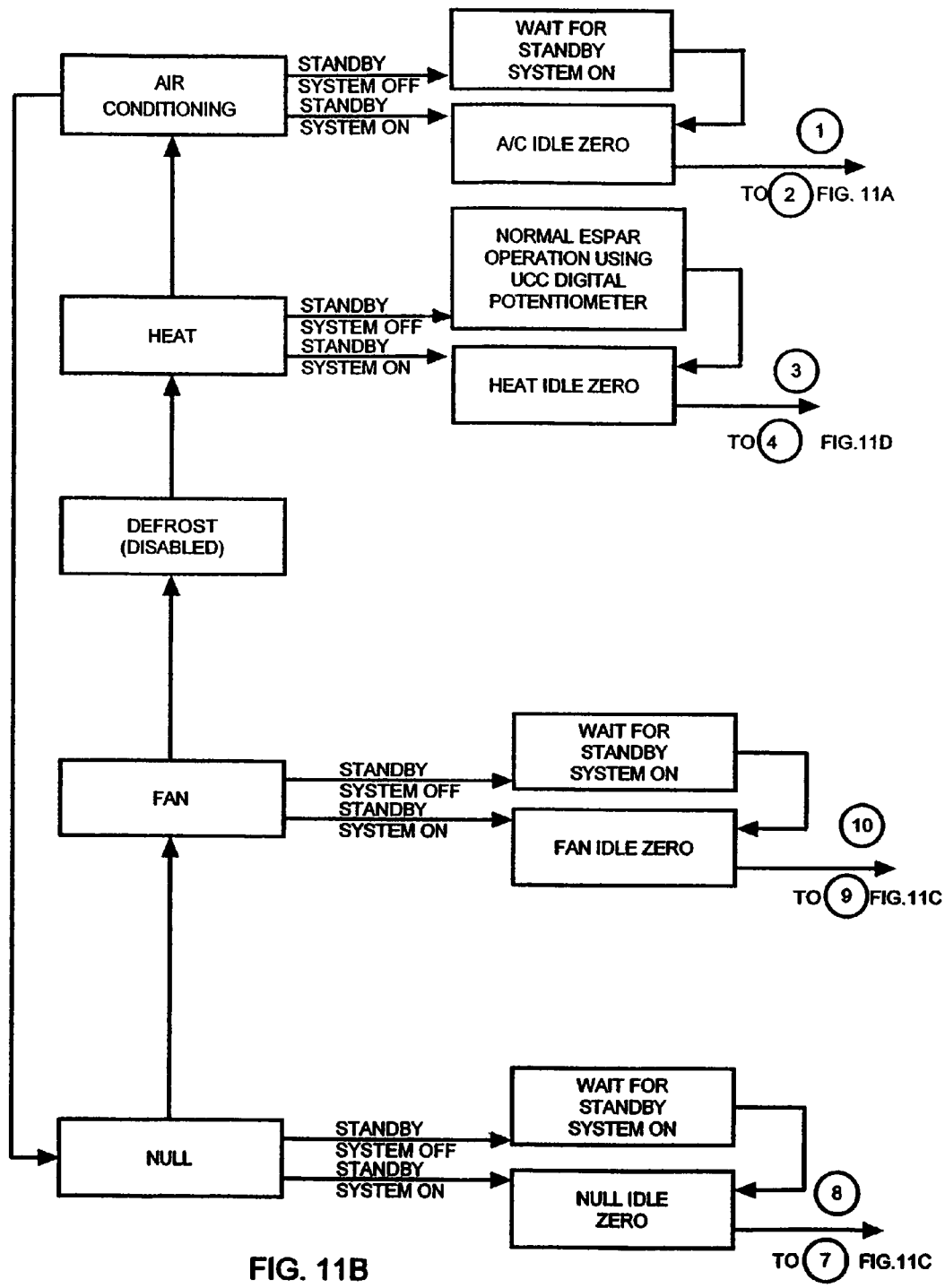
Figure 11C:
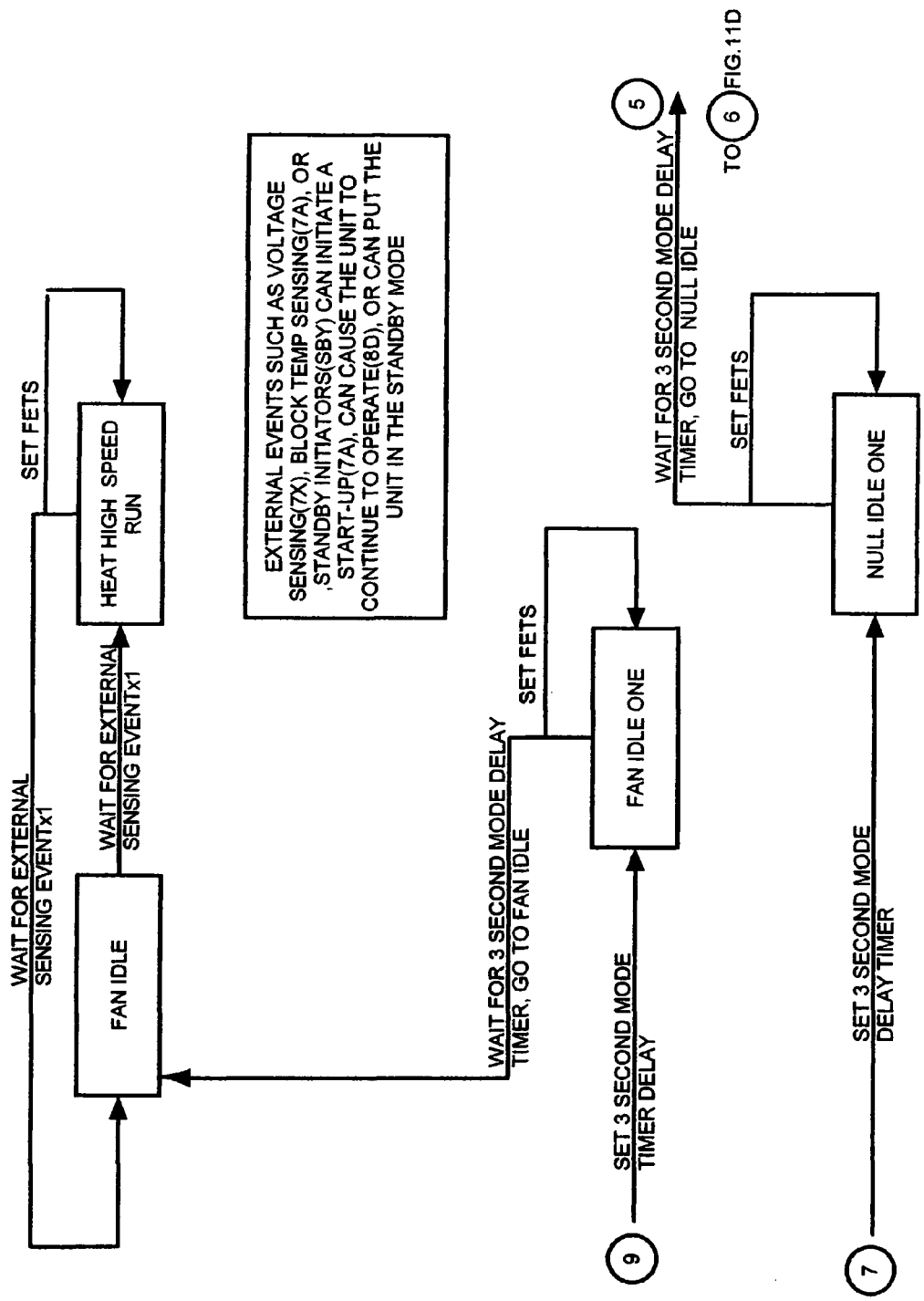
Figure 11D:
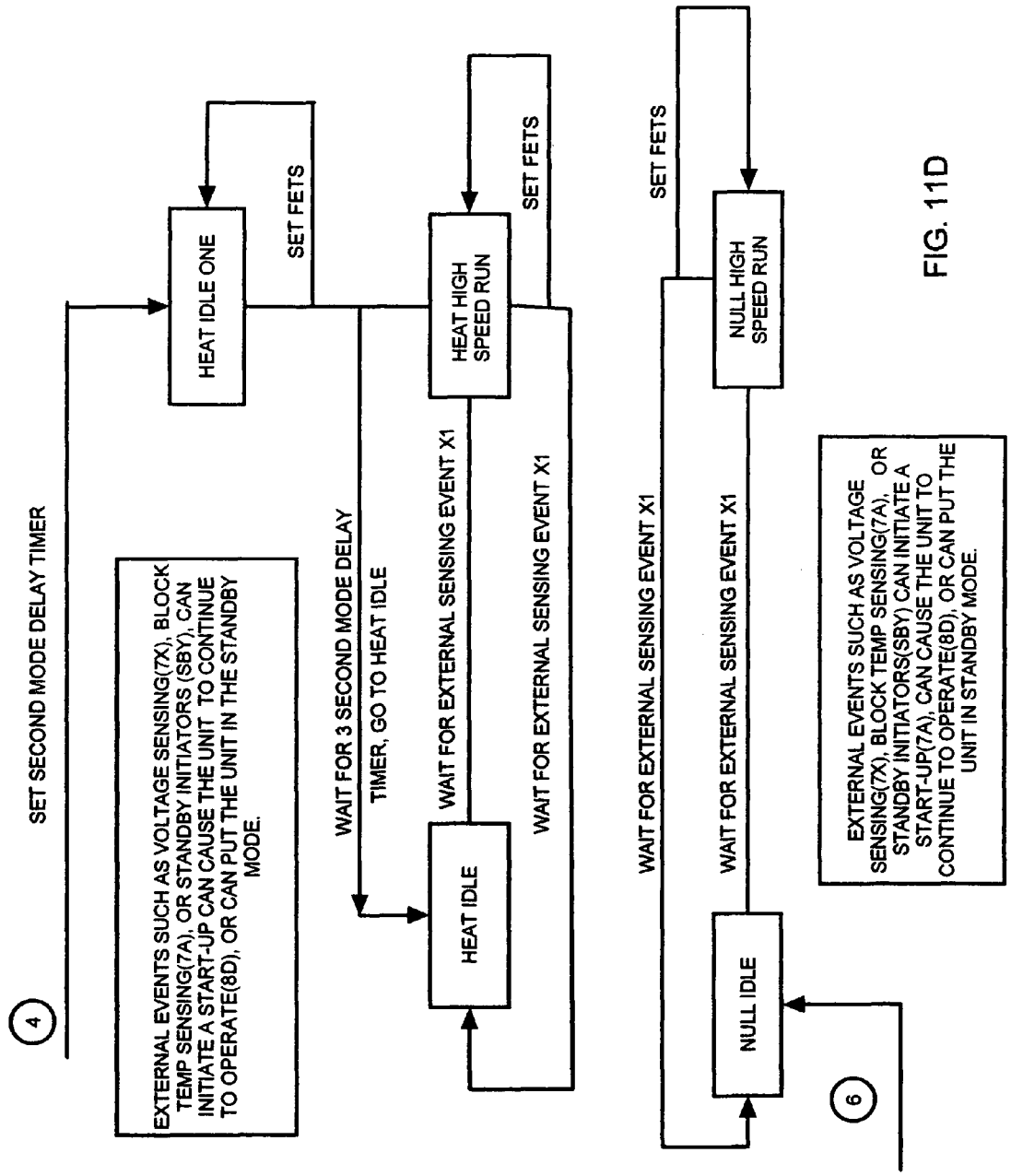

FIG. 11 shows a flow chart that includes one embodiment of control logic programmed into the control system 15. The microprocessor 150 controls the auxiliary power unit 40 and the secondary air conditioning system 55 according to input from the control module 145, the primary engine parameter, the cabin parameter, and the secondary engine parameter. Alternative constructions of the control system 15 may include additional control logic.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention should be taken as including all reasonable equivalents to the subject matter of the invention, and the foregoing description should not limit the scope of the invention set forth in the following claims.

Thus, the invention provides, among other things, a control system for a vehicle that includes a primary engine assembly and an auxiliary power unit. Various features and advantages of the invention are set forth in the following claims.

What is claimed is:

1. A control system for a vehicle that includes a cabin and a primary engine having an ignition switch, the control system comprising:
   an auxiliary power unit coupled to the primary engine and including a secondary engine; and
   a microprocessor in communication with the primary engine and the cabin and operable to activate the auxiliary power unit and to control an engine parameter and a cabin parameter when the primary engine is shutdown.

2. The control system of claim 1, further including a control module in electrical communication with the microprocessor, and wherein the control module is operable to deliver at least one signal indicative of a desired vehicle parameter to the microprocessor.

3. The control system of claim 2, wherein the auxiliary power unit is coupled with an air conditioning system in communication with the cabin, and wherein the microprocessor is operable to monitor and control the air conditioning system in response to the cabin parameter and the desired vehicle parameter.

4. The control system of claim 3, wherein the cabin parameter includes a measured cabin temperature and the desired vehicle parameter includes a desired cabin temperature, and wherein the microprocessor is operable to vary the measured cabin temperature in response to the desired cabin temperature.

5. The control system of claim 3, wherein the cabin parameter includes a first fan condition and the desired vehicle parameter includes a second fan condition, and wherein the microprocessor is operable to vary the fan in response to the first fan condition and the second fan condition.

6. The control system of claim 2, wherein the control module includes a plurality of modes, and wherein the microprocessor is operable to vary the control module from one of the plurality of modes to another of the plurality of modes in response to a position of the ignition switch.

7. The control system of claim 2, wherein the control module is operable to receive and to display a fault signal from the microprocessor indicative of a control system fault.

8. The control system of claim 1, wherein the cabin parameter includes at least one cabin accessory, and wherein the microprocessor is operable to provide power to the at least one cabin accessory.

9. The control system of claim 1, wherein the engine parameter includes a primary engine temperature, the microprocessor operable in response to the primary engine temperature to selectively activate the auxiliary power unit to warm the primary engine.

10. The control system of claim 1, wherein the engine parameter includes a battery voltage, the microprocessor operable in response to the battery voltage to selectively activate the auxiliary power unit to vary the battery voltage.

11. The control system of claim 1, wherein the control system further includes at least one engine sensor in communication with the primary engine and the microprocessor, and at least one cabin sensor in communication with the cabin and the microprocessor.

12. The control system of claim 11, wherein the at least one engine sensor is operable to deliver a signal indicative of the engine parameter to the microprocessor, and the at least one cabin sensor is operable to deliver a signal indicative of the cabin parameter to the microprocessor.

13. A vehicle comprising:
a primary engine including an engine parameter;
a cabin including a cabin parameter;
a control system including an auxiliary power unit coupled to the primary engine and having a secondary engine, and a microprocessor in communication with the primary engine and the cabin; and
wherein the microprocessor is operable to activate the auxiliary power unit and to control the primary engine parameter and the cabin parameter when the primary engine is shutdown.

14. The vehicle of claim 13, wherein the control system further includes a control module in electrical communication with the microprocessor and operable to deliver at least one signal indicative of a desired vehicle parameter to the microprocessor.

15. The vehicle of claim 14, further including a primary air conditioning system coupled with the primary engine and in communication with the cabin, and a secondary air conditioning system coupled with the auxiliary power unit and in communication with the cabin.

16. The vehicle of claim 15, wherein the microprocessor is operable to monitor and control the secondary air conditioning system in response to the cabin parameter and the desired vehicle parameter when the primary engine is shutdown.

17. The vehicle of claim 16, wherein the secondary air conditioning system includes a compressor attached to the auxiliary power unit, an evaporator, a heater, and at least one fan having a plurality of fan conditions.

18. The vehicle of claim 17, wherein the cabin parameter includes a measured cabin temperature and the desired vehicle parameter includes a desired cabin temperature, and wherein the microprocessor is operable to vary the measured cabin temperature in response to the desired cabin temperature.

19. The vehicle of claim 17, wherein the cabin parameter includes one of the plurality of fan conditions and the desired vehicle parameter includes another of the plurality of fan conditions, and wherein the microprocessor is operable to vary the fan in response to the one of the plurality of fan conditions and the another of the plurality of fan conditions.

20. The vehicle of claim 13, wherein the primary engine includes an ignition switch, and wherein the primary engine parameter is indicative of a position of the ignition switch.

21. The vehicle of claim 20, wherein the control system further includes a control module in electrical communication with the microprocessor and having a plurality of modes, and wherein the microprocessor is operable to vary the control module from one of the plurality of modes to another of the plurality of modes in response to the position of the ignition switch.

22. The vehicle of claim 13, wherein the secondary engine has a secondary engine parameter, and wherein the microprocessor is operable to monitor and control the secondary engine parameter.

23. The vehicle of claim 13, wherein the control system further includes at least one engine sensor in communication with the primary engine and the microprocessor, and at least one cabin sensor in communication with the cabin and the microprocessor.

24. The vehicle of claim 23, wherein the at least one engine sensor is operable to deliver a signal indicative of the engine parameter to the microprocessor, and the at least one cabin sensor is operable to deliver a signal indicative of the cabin parameter to the microprocessor.

25. The vehicle of claim 13, wherein the cabin parameter includes at least one cabin accessory, and wherein the microprocessor is operable to provide power to the at least one cabin accessory using the auxiliary power unit.

26. The vehicle of claim 13, wherein the engine parameter includes a battery voltage, the microprocessor operable in response to the battery voltage to selectively activate the auxiliary power unit to vary the battery voltage.

27. The vehicle of claim 14, wherein the control module is operable to receive and to display a fault signal from the microprocessor indicative of a control system fault.

28. The vehicle of claim 13, further including a fuel system and a coolant system, wherein the primary engine and the auxiliary power unit co-depend on the fuel system and the coolant system, and wherein the auxiliary power unit is operable to warm the primary engine through the coolant system when the primary engine is shutdown.

29. The vehicle of claim 13, further including a fuel system and a coolant system, wherein the primary engine and the auxiliary power unit co-depend on the fuel system and the coolant system, and wherein the primary engine is operable to warm the auxiliary power unit through the coolant system when the auxiliary power unit is shutdown.

* * * * *